United States Patent
Kanada

(10) Patent No.: US 8,199,675 B2
(45) Date of Patent: Jun. 12, 2012

(54) PACKET PROCESSING DEVICE BY MULTIPLE PROCESSOR CORES AND PACKET PROCESSING METHOD BY THE SAME

(75) Inventor: Yasusi Kanada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 301 days.

(21) Appl. No.: 12/708,136

(22) Filed: Feb. 18, 2010

(65) Prior Publication Data

US 2010/0215050 A1    Aug. 26, 2010

(30) Foreign Application Priority Data

Feb. 20, 2009   (JP) .................................. 2009-037933

(51) Int. Cl.
  *H04L 12/28* (2006.01)
(52) U.S. Cl. ........................................ 370/254; 370/389
(58) Field of Classification Search .................. 370/254, 370/255, 389, 392, 400, 401
See application file for complete search history.

(56) References Cited

U.S. PATENT DOCUMENTS

| | | | | |
|---|---|---|---|---|
| 6,351,775 B1* | 2/2002 | Yu | ................................. | 709/238 |
| 7,254,639 B1* | 8/2007 | Siegel et al. | .................. | 709/238 |
| 7,283,538 B2* | 10/2007 | Pham et al. | .................... | 370/401 |
| 7,672,236 B1* | 3/2010 | Karunakaran et al. | ...... | 370/230.1 |
| 7,830,896 B2* | 11/2010 | Srivastava | ..................... | 370/401 |
| 2005/0152354 A1* | 7/2005 | Abel et al. | ..................... | 370/389 |
| 2006/0069828 A1 | 3/2006 | Goldsmith | | |
| 2006/0126628 A1 | 6/2006 | Li et al. | | |
| 2007/0271564 A1* | 11/2007 | Anand et al. | .................. | 718/100 |

FOREIGN PATENT DOCUMENTS

| | | |
|---|---|---|
| JP | 2008-503015 A | 1/2008 |
| JP | 2008-523729 A | 7/2008 |

OTHER PUBLICATIONS

John McCarthy, Reminiscences on the History of Time Sharing, Stanford University, 1938 Winter or Spring, http://ww-formal.stanford.edu/jmc/history/timesharing/timesharing.html.
Egi, N. et al., Evaluating Xen for Router Virtualization, 16th Int'l Conference on Computer Communications and Networks (ICCCN 2007), pp. 1256-1261, Aug. 2007.

* cited by examiner

*Primary Examiner* — Hong Cho
(74) *Attorney, Agent, or Firm* — Mattingly & Malur, PC

(57) ABSTRACT

A packet processing device includes multiple processor cores and memory connected to the multiple processor cores, upon reception of a load request of a program, selects a processor core to which the program has not yet been loaded, loads the program to the selected processor core, retains first association information that associates attribute information specified by the load request with the processor core to which the program has been loaded, upon reception of the packet, specifies the attribute information corresponding to the received packet, and transfers the received packet to the processor core corresponding to the specified attribute information.

16 Claims, 10 Drawing Sheets

FIG. 4

| BID | NID | CID | EID |
|-----|-----|-----|-----|
| 0 | 1 | 0 |  |
| 0 | 1 | 1 |  |
| 0 | 1 | 2 | 800 |
|  |  |  |  |
|  |  |  |  |
| 1 | 2 | 0 |  |
| 1 | 2 | 1 | 617 |

PACKET PROCESSING DEVICE BY MULTIPLE PROCESSOR CORES AND PACKET PROCESSING METHOD BY THE SAME

CLAIM OF PRIORITY

The present application claims priority from Japanese patent application JP 2009-037933 filed on Feb. 20, 2009, the content of which is hereby incorporated by reference into this application.

FIELD OF THE INVENTION

The present invention relates to processing of a data stream such as a packet stream in a network.

BACKGROUND OF THE INVENTION

One object of the data stream processing in the network is to provide plural advanced services that cannot coexist on a network node to plural users, and further to enable addition/deletion of a service and alteration of a content of the service during a network operation. In order to provide such a service with one physical network, it is required to virtualize the network, that is, to show as if the each user or each user group is using an independent network. In addition, in each network node, in order to process an advanced service, it is required to process a packet stream that is inputted from a communication line and is outputted to the communication line at a speed as close to a maximum transfer speed (wire speed) of the communication line as possible.

There are the following four technologies as the conventional technologies that are usable for the data stream processing in a network.

As the first conventional technology, a computer that is capable of executing plural users' programs in parallel or by time division, i.e., in a parallel manner by time sharing can be enumerated. As a literature related to a time sharing system, there is John McCarthy, "REMINISCENCES ON THE HISTORY OF TIME DIVISION," Stanford University, 1983 Winter or Spring, http://www-formal.stanford.edu/jmc/history/timesharing/time sharing.html In a computer with a general purpose operating system (OS) based on the time sharing system, such as Linux (registered trademark) or Microsoft Windows (registered trademark), installed, common resources, such as a processor and memory, are virtualized and the each user can use them as if the user exclusively uses them. Processor resources are shared based on a task switch. That is, when plural processes and threads exist, the OS performs the task switch between them. It is possible to build a network node (so-called a software router), and to perform a stream data processing using such a computer.

However, since a register file and cache are purged in performing the task switch, it is necessary to reload the data and the program from DRAM (Dynamic Random Access Memory) immediately after the task switch. Because of a delay by this switching, a delay required to reload the data and the program, and a huge number of processing steps, it is impossible to perform the processing at a speed close to the wire speed.

As the second conventional technology, there is a virtualized software technology that builds a virtual environment for the each user by making the operating system different for the each user operate by time division on one piece of hardware. Egi, N., Greenhalgh, A., Handley, M., Hoerdt, M., Mathy, L., and Schooley, T., "Evaluating Xen for Router Virtualization," 16th Int'l Conference on Computer Communications and Networks (ICCCN 2007), pp. 1256-1261, August 2007 describes a method of virtualizing hardware resources, such as a network interface, using virtualized software Xen (registered trademark) and realizing a virtualized node.

Also in the virtualized software technology, since the processor is used by time division like in the time sharing system, the problem generated by the task switch as described above is unsolvable. Moreover, in the network, although addresses of the third layer (IP layer) of a sender and an addressee are included in a packet used for communication, when the switch transfers the packet based on information of the second layer, an address of the switch for repeating the packet is not included in the packet. However, it is necessary to attach an address to the network interface in the virtual software technology in order to perform communication, and there is a problem that it is required to designate this address as an address of the packet.

As the third conventional technology, there is a physical device virtualization technology described in JP-T-2008-503015. JP-T-2008-503015 discloses the technology whereby inputted or outputted data is allocated to programs of the plural users and is processed by virtually multiplexing a single physical device. One example of the physical device is the network interface.

Since the processor is used by time division like the time sharing system also in the physical device virtualization technology, the problem generated by the task switch as described above cannot be solved. Moreover, a point that it is necessary to specify an address of the network interface that is virtually multiplexed as a destination of the packet poses a problem similarly.

As a fourth conventional technology, there is a programmable router and a switch. The conventional router and switch cannot be programmed by the user, but, contrary to this, programmable router and switch enable a program (s) to be given from the outside by allowing a network processor or FPGA (Field Programmable Gate Array) to be installed therein.

JP-T-2008-523729 describes a method of allocating an inputted packet to plural processor cores in which such programs operate.

However, since the program that the processor core executes is fixed in advance and a destination to which the packet is allocated is also fixed in this method, it is possible to perform neither addition/deletion of a service nor alteration of a service content during an operation of the network.

SUMMARY OF THE INVENTION

With sophistication of the network service, network providers have become to be requested to develop high-speed services that are oriented for various businesses different for each user group. Moreover, for research and development of a new network architecture, it is sought for to realize a different protocol or data processing for the each user (especially each researcher). In order to provide such services or development environments, it is strongly desired in each network node, under a virtualized environment for the each user group or service that a flexible program realizing a different network service for each virtualized environment (namely, for each user group) is operable and a packet stream is processed at the wire speed by the program.

When performing plural processings with one piece of hardware as described above, a task switch by OS is generated and consequently a wire speed processing becomes impossible. In order to realize the wire speed processing and to realize flexible programming, it is required to build a virtual environment for the each user or service.

That is, first, when load of a program is requested from the user or service, it is required to perform a setup (namely, to load a program) so that the program is executed in a processor belonging to the virtual environment to which the user or service should belongs with neither halting an operation of the network nor losing a packet by operation delay etc.

Second, when unload of the program is requested by the user or the program, it is required to delete the program (namely, to unload the program) that has been loaded into the processor belonging to the virtual environment to which the user or service should belong without losing the packet by operation halt or delay of the network.

Third, it is required for the processor allocated to the each virtual environment to which the program is loaded to execute the program without using the task switch by software.

Fourth, when the packet belonging to the user or service concerned is inputted, it is required to find an identifier of the virtual environment to which the user or service should belong and to transfer the packet to the processor allocated to the virtual environment at the wire speed without delay.

The object of this invention is to provide a network node device and its method that solve the four problems described above, i.e., building the virtual environments different for the each user or service, and being capable of performing the data stream processing at high speed.

A typical aspect of the invention disclosed by this application is a packet processing device connected to a network, the packet processing device, being equipped with multiple processor cores and memory connected to the multiple processor cores, wherein, upon reception of a load request of a program, it selects a processor core to which a program has not yet been loaded among the multiple processor cores, loads the program to the selected processor core, and retains first association information that associates attribute information specified by the load request and the processor core to which the program is loaded, and upon reception of the packet, specifies attribute information corresponding to the received packet, and transfers the received packet to the processor core corresponding to the specified attribute information.

According to one embodiment of the present invention, the virtual environment is built for the each user or service, and the user's packet is transferred to a core in which the user's program is operating at high speed. For this reason, the wire speed processing is realized and flexible programming is realized.

BRIEF DESCRIPTION OF THE DRAWINGS

FIG. 4 is an explanatory diagram of a core allocation table according to the first embodiment of the present invention;

DETAILED DESCRIPTION OF THE PREFERRED EMBODIMENTS

Figure 1:
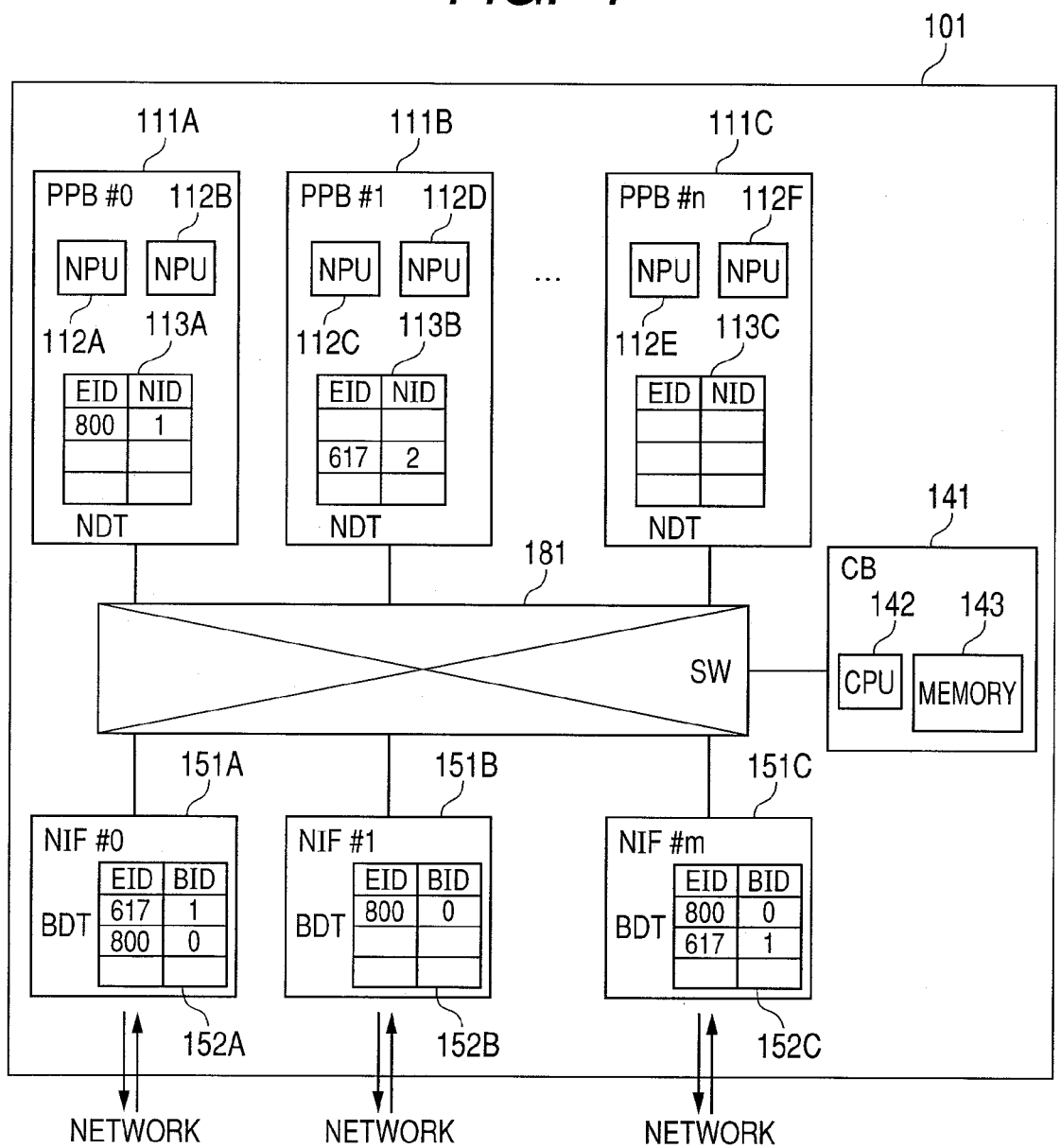
FIG. 1 is a block diagram showing an entire configuration of a packet processing device according to a first embodiment of the present invention.

First, an outline of embodiments of the present invention will be described.

In order to solve the above-mentioned problems, a packet processing device according to an embodiment of the present invention uses a correspondence table of user/service identification information and a virtual environment identifier and a correspondence table of the virtual environment identifiers for program load and for packet transfer and a board, an NPU, and a core.

A virtual environment is associated with the user, a service, or the like. The user recognizes one virtual environment as one independent network. The virtual environment is identified by the virtual environment identifier. That is, the virtual environment identifier is attribute information that is associated with the user identification information, the service identification information, or the like.

For example, there is a case where the each user requests mutually different processings to the packet processing device. In this case, the each user is associated with the each virtual environment. Then a program for performing the processing requested by the each user is loaded to a processor in the packet processing device.

Alternatively, there is a case where a processing that the packet processing device should execute differs for each service used by the user. For example, there is a case where the each user requests a different protocol processing to the same packet, but it cannot be realized in a single environment. In this case, the each service is associated with the each virtual environment. Then, a program for executing a processing that is required in the each service is loaded to the processor in the packet processing device.

An outline of the processing that the packet processing device performs is as follows.

First, prior to occurrence of a program load request from the user, the packet processing device determines a content of the correspondence table of the user/service identification information and the virtual environment identifier. Next, when the load request occurs, the packet processing device first allocates one or multiple cores not yet allocated (and the board and the NPU in which the core exists) to its virtual environment (the user/service) (namely, a fact that it is allocated in this way is written into this correspondence table) based on the correspondence table of the virtual environment identifier for program load, and the board, the NPU (processor), and the core (processor core). Second, the packet processing device loads a user program so that the program may be executed in the allocated core. Third, the packet processing device writes the identifiers of the above-mentioned board, NPU, and core into entries corresponding to the virtual environment in the correspondence table of the virtual environment identifier for packet transfer, the board, the NPU, and the core.

When the user's packet arrives at the processing device, first, the packet processing device identifies the user or service based on the content of the packet, and finds the virtual environment identifier using the correspondence table of the user/service identification information and the virtual environment identifier. Next, by using the correspondence table of the virtual environment identifier, and the virtual environment identifier for packet transfer, and the board, the NPU and the core, the packet processing device transfers the packet to a relevant core.

At the time of requesting unload, based on the user/service identification information included in the request information, the packet processing device finds the virtual environment identifier using the correspondence table of the user/service identification information and the virtual environment identifier. Then, the packet processing device deletes the content of an entry related to the program to be unloaded from the correspondence table of the virtual environment identifiers for program load and for packet transfer, and the board, the NPU, and the core.

Next, detailed embodiments each for realizing the above-mentioned processing will be explained.

First, a first embodiment of the present invention will be explained.

FIG. 1 is a block diagram showing an entire configuration of the packet processing device 101 according to the first embodiment of the present invention.

The packet processing device 101 consists of one or plural packet processing boards (PPB) 111, one or plural network interfaces (NIF) 151 each of which are connected to a network, a control board (CB) 141, and a switch fabric 181 for connecting them.

FIG. 1 shows the packet processing device 101 equipped with n packet processing boards 111 and m network interfaces 151 as an example. However, FIG. 1 shows only three of the n packet processing boards 111 as packet processing boards 111A, 111B, and 111C, and shows only three of the m network interfaces 151 as network interfaces 151A, 151B, and 151C. When giving an explanation common to all of the packet processing boards 111A to 111C in this embodiment, these are also generically named and described a packet processing board 111. Similarly, when giving an explanation common to all of the network interfaces 151A to 151B, these are also generically named and described a network interface 151.

The packet processing board 111 includes one or plural network processing units (NPU's) 112, and a virtual environment-NPU dispatch table (NDT) 113. The virtual environment-NPU dispatch table 113 is a table that includes sets of the virtual environment identifiers and NPU identifiers as elements.

FIG. 1 shows an example in which the each packet processing board 111 includes two network processing units 112. The packet processing board 111A has network processing units 112A and 112B, the packet processing board 111B has network processing units 112C and 112D, and the packet processing board 111C has network processing units 112E and 112F, respectively. When giving an explanation common to all of the network processing units 112A to 112F in this embodiment, these are also generically named and described the network processing unit 112.

In the example of FIG. 1, the packet processing board 111A includes a virtual environment-NPU dispatch table 113A, the packet processing board 111B includes a virtual environment-NPU dispatch table 113B, and the packet processing board 111C includes the virtual environment-NPU dispatch table 113C, respectively. When giving an explanation common to all of the virtual environment-NPU dispatch tables 113A to 113C in this embodiment, these are also generically named and described a virtual environment-NPU dispatch table 113.

The each packet processing board 111 is given an identifier based on an integer, and the each network processing unit 112 is also given an identifier based on an integer. For example, "PPB #0" displayed on the packet processing board 111A of FIG. 1 expresses that the packet processing board (PPB) 111A is given the identifier (in this case, identification number) "0."

Although omitted in FIG. 1, the each packet processing board 111 further includes memory connected to the each network processing unit 112 (refer to FIG. 2 and FIG. 3 that will be described later).

FIG. 1 shows an example in which the each packet processing board 111 is mounted as an independent board. However, the each packet processing board 111 may be mounted as the packet processing module with any form having an equivalent function to it.

The network interface 151 includes a virtual environment-board dispatch table (BDT) 152. The virtual environment-board dispatch table 152 includes a set of the virtual environment identifier and a board identifier as an element.

In an example of FIG. 1, the network interface 151A includes a virtual environment-board dispatch table 152A, the network interface 151B includes a virtual environment-board dispatch table 152B, and the network interface 151C includes a virtual environment-board dispatch table 152C, respectively. When giving an explanation common to all of the virtual environment-board dispatch tables 152A to 152C in this embodiment, these are also generically named and described the virtual environment-board dispatch table 152.

The control board 141 includes a general purpose CPU 142 and a main storage (memory) 143 connected to the general purpose CPU 142.

In FIG. 1, the virtual environment-NPU dispatch table 113 associates the virtual environment identifier (EID) with the NPU in a one-to-one relationship, and the virtual environment-board dispatch table 152 associates the virtual environment identifier with the board in a one-to-one relationship. For example, the virtual environment-NPU dispatch table 113A associates a virtual environment identifier "800" with an NPU identifier "1" in a one-to-one relationship, and the virtual environment-board dispatch table 152A associates the virtual environment identifier "800" with a board identifier "0" in a one-to-one relationship. However, the virtual environment-NPU dispatch table 113 can also associate plural NPU's with one virtual environment identifier. Similarly, the virtual environment-board dispatch table 152 can also associate plural boards with one virtual environment identifier.

In FIG. 1, since it is necessary to allocate a packet inputted into the packet processing board 111 to plural network processing units 112, the virtual environment-NPU dispatch table 113 is required. However, in the case where the one packet processing board 111 includes only one network processing unit 112, or in the case where the each packet processing board 111 is connected to the switch fabric 181 with as much interfaces as the network processing units 112, allocation of the packet is unnecessary, and consequently the virtual environment-NPU dispatch table 113 is unnecessary.

The packet inputted from the network is transferred to the packet processing board 111 via the network interface 151 and the switch fabric 181 and is processed there. Then, the packet is transferred to another packet processing board 111 via the switch fabric 181, or is outputted to the network via the network interface 151. It is determined, based on the virtual environment-board dispatch table 152 that the network interface 151 includes, to which one among the plural packet processing boards 111 the packet inputted in the network interface 151 is transferred. Moreover, it is determined based on the virtual environment-NPU dispatch table 113, to which unit among the plural network processing units 112 the packet that should be processed in the packet processing board 111 is transferred.

Incidentally, the virtual environment-board dispatch table 152A of the network interface 151A (NIF #0) whose network interface identifier is "0" includes a pair of a virtual environment identifier "617" and a board identifier "1" and a pair of the virtual environment identifier "800" and the board identifier "0." In the following explanation, the pair of the identifier "617" and the identifier "1" is indicated, by "617-1."

In the virtual environment-NPU dispatch table 113A of the packet processing board 111A (PPB #0) whose board identifier is "0" includes a pair "800-1" as a pair of the virtual environment identifier and the NPU identifier corresponding to it. The virtual environment-NPU dispatch table 113B of the packet processing board 111B (PPB #1) whose board identifier is "1" includes a pair "617-2."

In FIG. 1, since the plural network processing units 112 exist on each packet processing board 111, it is necessary to select the network processing unit 112 using the virtual environment-NPU dispatch table 113. However, in the case where the one packet processing board 111 includes only one network processing unit 112, the virtual environment-NPU dispatch table 113 can be omitted.

Even in the case where the plural network processing units 112 exist on the packet processing board 111, when the packet processing board 111 can output and input the packet independently for each network processing unit 112, that is, when wiring from the switch fabric 181 to each network processing unit 112 is independent, the virtual environment-NPU dispatch table 113 can be omitted likewise.

Figure 2:
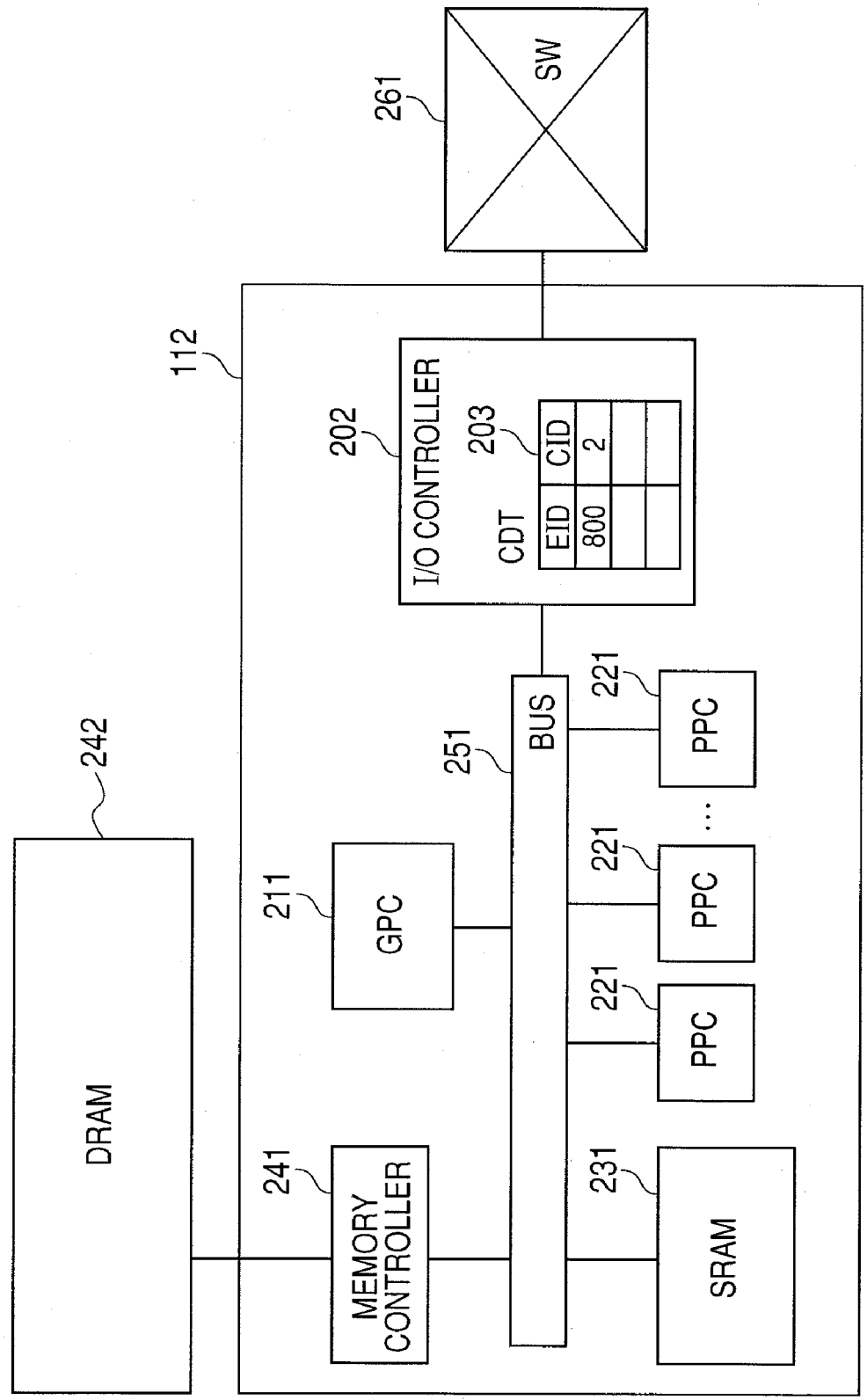
FIG. 2 is a block diagram showing a configuration of a network processing unit according to the first embodiment of the present invention.

FIG. 2 is a block diagram showing a configuration of the network processing device (NPU) 112 according to the first embodiment of the present invention.

The network processing unit 112 shown in FIG. 2 consists of one general purpose processing core (GPC) 211, multiple packet processing cores (PPC) 221, an I/O control device (I/O Controller) 202, SRAM (Static Random Access Memory) 231, memory control device (Memory Controller) 241, and a bus 251 for connecting these. The each packet processing core 221 is given an identifier based on an integer.

The general purpose processing core 211 is mainly used for a control processing (for example, load/unload processings of a program), and a data processing is mainly performed in parallel in the multiple packet processing cores 221. The I/O control device 202 is connected to the outside of the network processing unit 112, i.e., to a switch 261 placed on the packet processing board 111. Moreover, the I/O control device 202 includes a virtual environment-core dispatch table (CDT) 203 that is a table each of whose elements is a pair of the virtual environment identifier and a core identifier.

In the case where the network processing unit 112 includes the multiple packet processing cores 221, as shown in FIG. 2, the virtual environment-core dispatch table 203 stores the identifier of the packet processing core 221 as the core identifier. On the other hand, in the case where the network processing unit 112 shown in FIG. 3 includes the multiple general purpose processing cores 211, the virtual environment-core dispatch table 203 stores the identifiers of the general purpose processing core 211 as the core identifiers.

The SRAM 231 is the main storage small in capacity but with a small delay. The memory control device 241 is connected to DRAM (Dynamic Random Access Memory) 242 in the outside of the network processing unit 112, i.e., placed on the packet processing board 111. The DRAM 242 is the main storage large in capacity but with a slightly larger delay.

In FIG. 2, the virtual environment-core dispatch table 203 associates the virtual environment identifier with the core in a one-to-one relationship. However, the virtual environment-core dispatch table 203 can also associate one virtual environment identifier with multiple cores.

The switch 261 transfers the packet data that arrives at the packet processing board 111 via the switch fabric 181 to the I/O control device 202. The I/O control device 202 transfers the packet data to the SRAM 231 via the bus 251, and also to the DRAM 242 via the memory control device 241. The data stored in the SRAM 231 or the DRAM 242 is processed in the packet processing core 221, and subsequently is stored again in the SRAM 231 or the DRAM 242, or is outputted to the outside of the network processing unit 112 via the I/O control device 202.

For example, in the case where the NPU 112 shown in FIG. 2 is the NPU 112 of the NPU identifier "1" in the packet processing board 111A (PPB #0) of the board identifier "0," the virtual environment-core dispatch table 203 of the I/O control device 202 includes a pair "800-2" as a pair of the virtual environment identifier and the core identifier corresponding to it.

Figure 3:
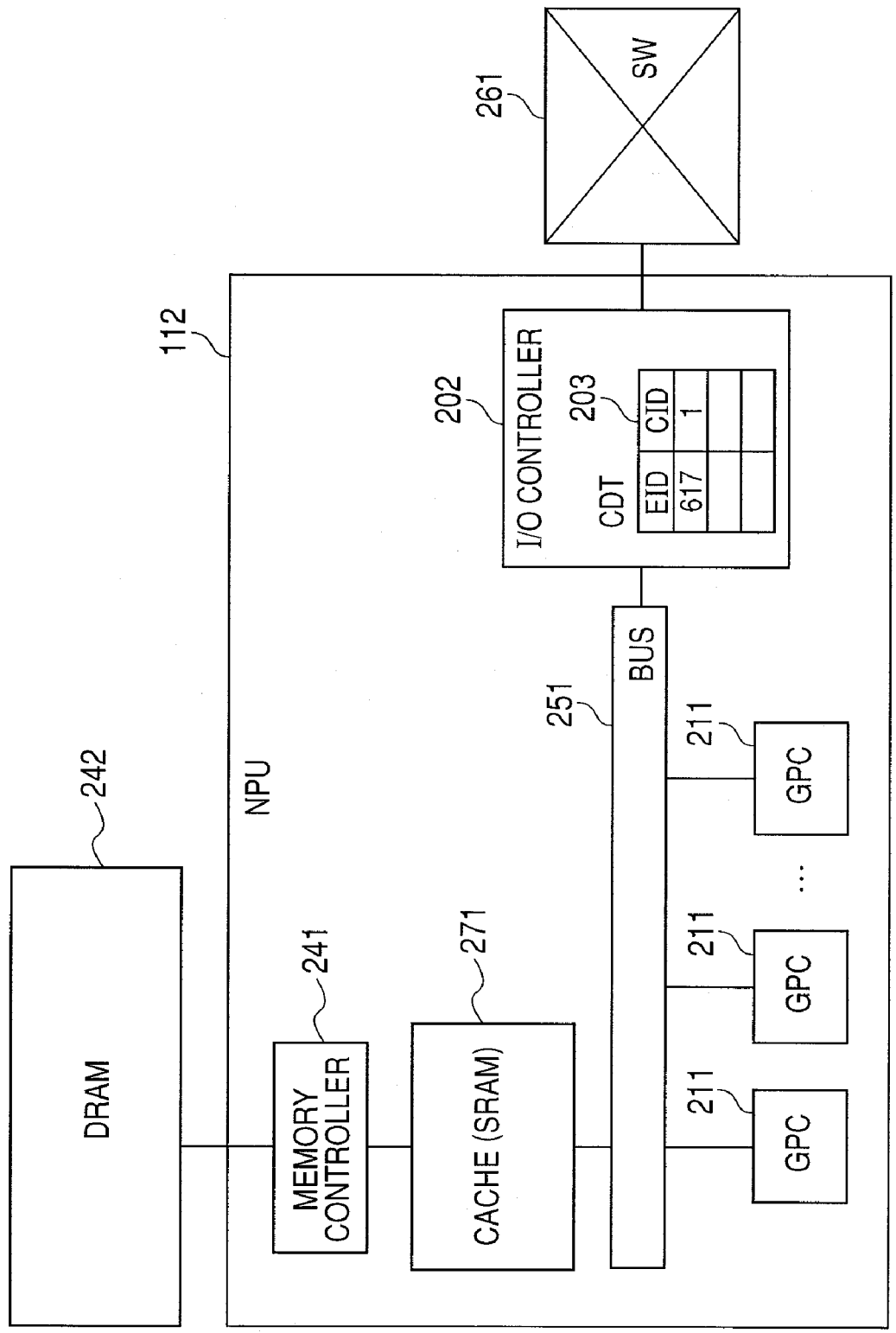
FIG. 3 is a block diagram showing another example of the configuration of the network processing unit according to the first embodiment of the present invention.

FIG. 3 is a block diagram showing another example of the configuration of the network processing device (NPU) 112 according to the first embodiment of the present invention.

The network processing unit 112 shown in FIG. 3 consists of the multiple general purpose processing cores (GPC's) 211, the I/O control device (I/O Controller) 202, cache 271, and the bus 251 that connects these.

Data processing is performed in parallel in the general purpose processing core 211. Furthermore, the general purpose processing core 211 also performs a control processing (e.g., load and unload processing of the program). The cache 271 is a storage device (e.g., SRAM) that is small in capacity but has a small delay, and stores only pieces of data that were accessed recently among data that is stored in the main storage from the general purpose processing core 211 or the I/O control device 202. Other pieces of data are stored in the DRAM 242 via the memory control device 241. Although the memory control device 241 normally controls automatically transfer of the data from the cache 271 to the DRAM 242 and deletion of it from the cache 271, it also has a function of inhibiting this operation for a specific address range of the main storage device.

For example, in the case where the NPU 112 shown in FIG. 3 is the NPU 112 with an NPU identifier "2" in the packet processing board 111B (PPB #1) with the board identifier "1," the virtual environment-core dispatch table 203 of the I/O control device 202 includes a pair "617-1" as the pair of the virtual environment identifier and the core identifier corresponding to it.

Figure 4:
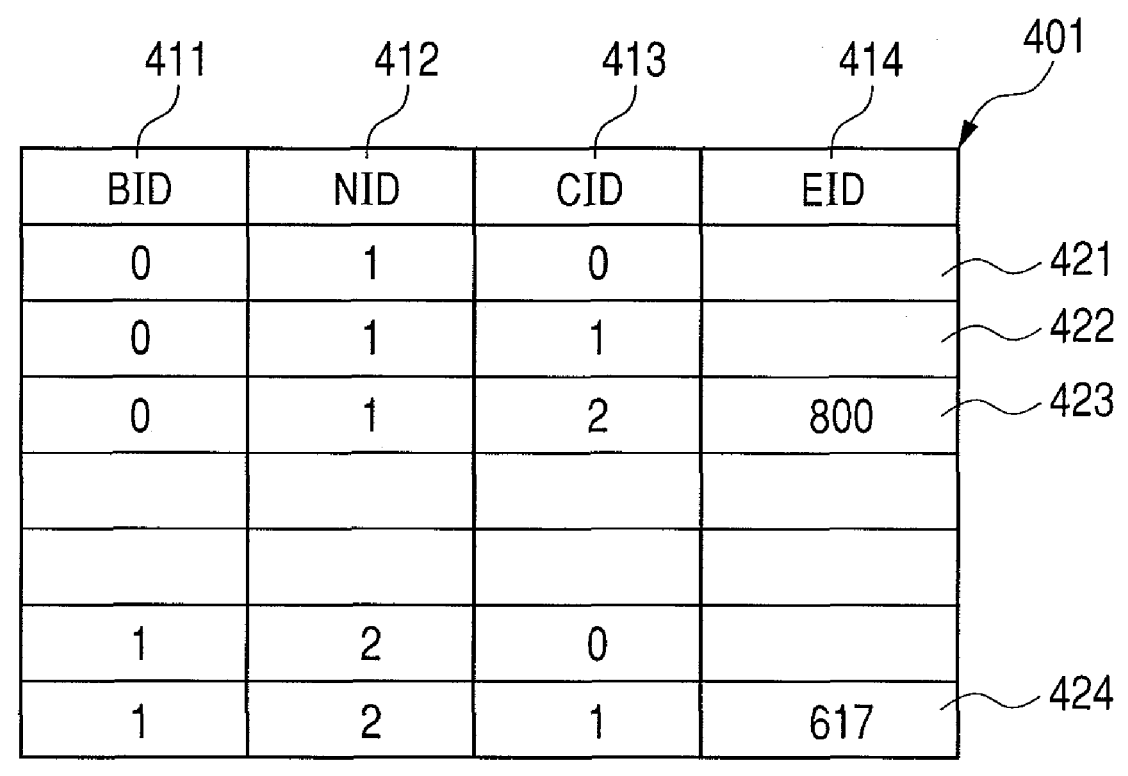

FIG. 4 is an explanatory diagram of a core allocation table 401 according to the first embodiment of the present invention.

The core allocation table 401 is stored in the memory 143 on the control board 141, and associates the virtual environment identifier for program load with the board, the NPU and the core. Specifically, the core allocation table 401 includes information that associates a virtual environment identifier (EID) 414 with a board identifier (BID) 411, an NPU identifier (NID) 412, and a core identifier (CID) 413 for identifying the core allocated to the environment.

Each core can be uniquely identified in the packet processing device 101 by a set of three identifiers: the core identifier 413 whereby the core (namely, the packet processing core 221 or the general purpose processing core 211) is uniquely identified in the network processing unit 112; the NPU identifier 412 whereby the network processing unit 112 is uniquely identified in the packet processing board 111; and the board identifier 411 whereby the packet processing board 111 is uniquely identified in the packet processing device 101.

In the core allocation table 401, the virtual environment identifier "800" corresponds to the core identified by the board identifier "0," the NPU identifier "1," and a core identifier "2" (Line 423), and the virtual environment identifier "617" corresponds to the core identified by the board identifier "1," the NPU identifier "2," and a core identifier "1" (Line 414). This represents that a core identified by the board identifier "0," the NPU identifier "1," and the core identifier "2" is allocated to the virtual environment identified by the virtual environment identifier "800," and a core identified by the board identifier "1," the NPU identifier "2," and the core identifier "1" is allocated to the virtual environment identified by the virtual environment identifier "617."

On the other hand, the virtual environment identifier 414 that corresponds to a core identified with the board identifier "0," the NPU identifier "1," and a core identifier "0" and to a core identified with the board identifier "0," the NPU identifier "1," and the core identifier "1" is not written (Line 421 and Line 422). This expresses that these cores are not in use (namely, not being allocated to any virtual environment).

In the case where the network processing unit 112 includes the multiple packet processing cores 221 as in FIG. 2, the core allocation table 401 stores identifiers of the packet processing cores 221 as the core identifiers. On the other hand, in the case where the network processing unit 112 includes the multiple general purpose processing cores 211 as in FIG. 3, the core allocation table 401 stores an identifier of the general purpose processing core 221 as the core identifier.

The program load request and a program unload request by the user arrive at the control board 141 from the outside of the packet processing device 101 via the network interface 151. The program load request includes the user/service identification information or virtual environment identifier, the number of requested cores, and a program that is to be loaded or its identification information (URL etc.). The program unload request includes the user/service identification information or virtual environment identifier and the number of requested cores. However, when the number of requested cores is "1," the number of requested cores can be omitted.

Figure 5:
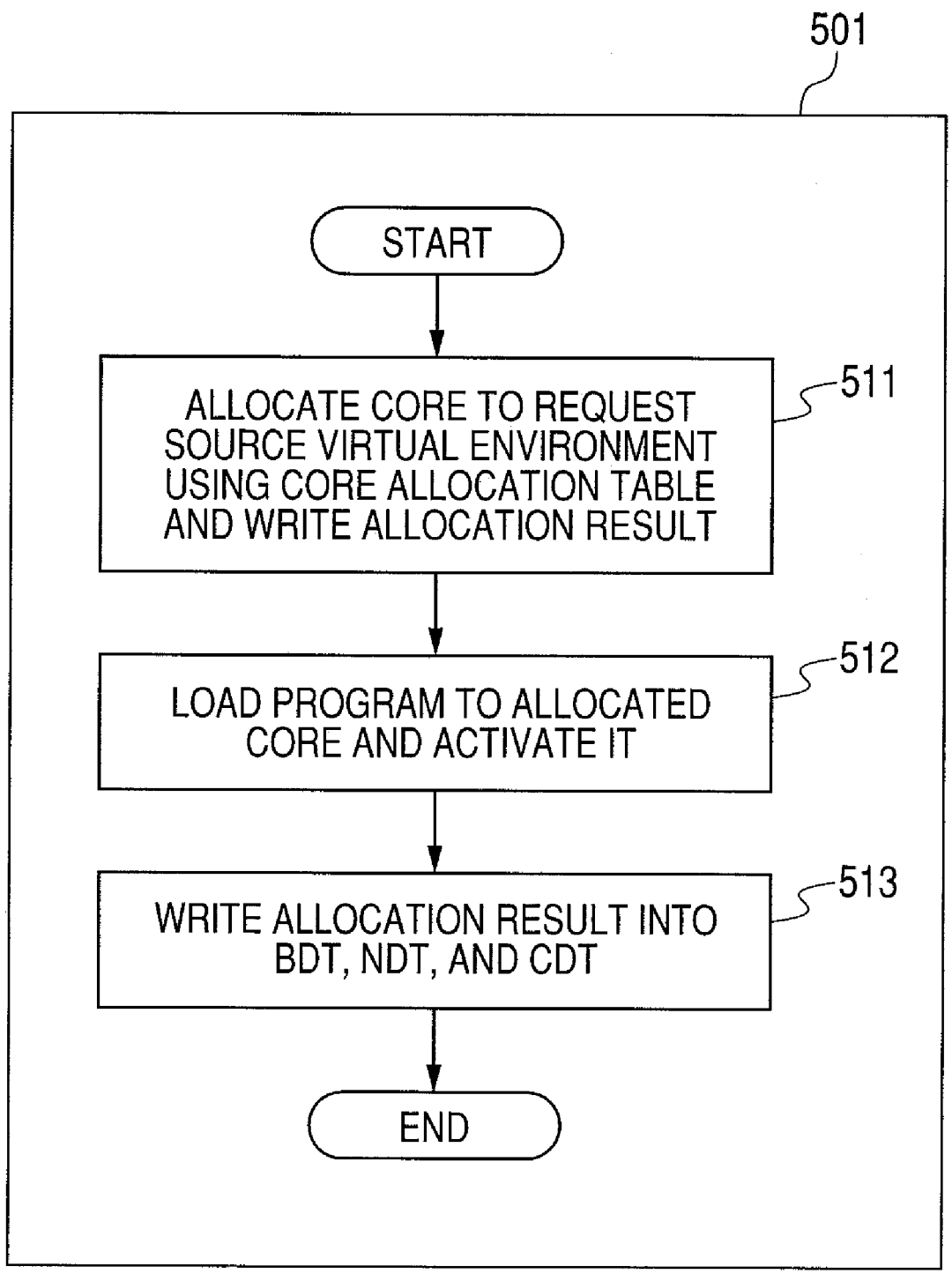
FIG. 5 is a flowchart showing a processing performed when a control board according to the first embodiment of the present invention receives a program load request from a user.

FIG. 5 is a flowchart showing a processing 501 that is performed when the control board 141 according to the first embodiment of the present invention receives the program load request from the user.

When execution of the processing 501 is started; first, at Step 511, the control board 141 allocates a core to a request source virtual environment based on the core allocation table 401, and writes the allocation result into the core allocation table 401. That is, the control board 141 specifies lines each of whose columns of the virtual environment identifier (EID) is a blank column in the core allocation table 401 as much as the number of requested cores, and writes the virtual environment identifier of the request source into the virtual environment identifier 414 of the specified lines. By this selection of the line, respective values of the board identifier 411, the NPU identifier 412, and the core identifier 413 are selected.

Next, at Step 512, the general purpose processing core 211 loads a program to the allocated core (namely, the general purpose processing core 211 or the packet processing core 221 corresponding to the line specified at Step 511), and activates the allocated core. The program is normally stored in the main storage that consists of the DRAM 242 and the memory control device 241 (in the example of FIG. 3, additionally the cache 271) or instruction cache that is built in the core, but may be stored in the SRAM 231. In the case where the main storage or the core is shared by multiple cores, after storing the program in them, a start address of a domain where the program is stored is loaded to a register of the object core.

In the configuration of FIG. 2, since the packet processing core 221 is configured to be exclusively used for the packet processing, there is a case where load and activation of the program cannot be done. In that case, what is necessary is for the general purpose processing core 211 included in the network processing device to perform the load and the activation processing.

Next, at Step 513, an allocation result is written into the virtual environment-core dispatch table 203, the virtual environment-NPU dispatch table 113, and the virtual environment-board dispatch table 152. That is, a content of each one line in each of these tables is determined so as to match with a set of the board identifier, the NPU identifier, and the core identifier that were specified in the processing 501 and the virtual environment identifier. Based on a direction from the control board 141, this writing is performed by the I/O-control device 202, the packet processing board 111, and the network interface 151.

Here, a processing of FIG. 5 will be explained by taking a case where the program load request that specifies the virtual environment identifier "800" and the number of requested cores "1" is received at the time when "800" has not yet been stored as the virtual environment identifier 414 of Line 423 of FIG. 423 as an example.

In this case, at Step 511, the control board 141 specifies one line whose column of the virtual environment identifier 414 is a blank column, e.g., Line 423, and writes "800" as the virtual environment identifier 414 of that Line 423.

When Line 423 is specified as described above, at Step 512, the control board 141 transmits a request to load a program to the core corresponding to Line 423, to the packet processing board 111 that includes the core. In this case, the program is loaded to the core identified by the core identifier "2" that the network processing unit 112 identified by the NPU identifier "1" in the packet processing board 111 identified by the board identifier "0" includes. If the core is the general purpose processing core 211, that general purpose processing core 211 itself may perform load of the program. If the core is the packet processing core 221, the general purpose processing core 211 connected to the packet processing core 221 will perform the load of the program.

At Step 513, the control board 141 transmits a request to update each table so that it may match with a content of Line 423 to each part in the packet processing device 101. In compliance with the request, the network interface 151 adds a line that associates the virtual environment identifier "800" with the board identifier "0" to the virtual environment-board dispatch table 152 (refer to the virtual environment-board dispatch tables 152A to 152C of FIG. 1). The packet processing board 111 that is identified by the board identifier "0" (in an example of FIG. 1, the packet processing board 111A) adds a line that associates the virtual environment identifier "800" and the NPU identifier "1" to the virtual environment-NPU dispatch table 113. The I/O control device 202 in the network processing unit 112 (in the example of FIG. 1, the network processing unit 112B) adds a line that associates the virtual environment identifier "800" and the core identifier "2" to the virtual environment-core dispatch table 203. As a result, the same content as at least a part of the core allocation table 401 is stored in the each dispatch table.

Figure 6:
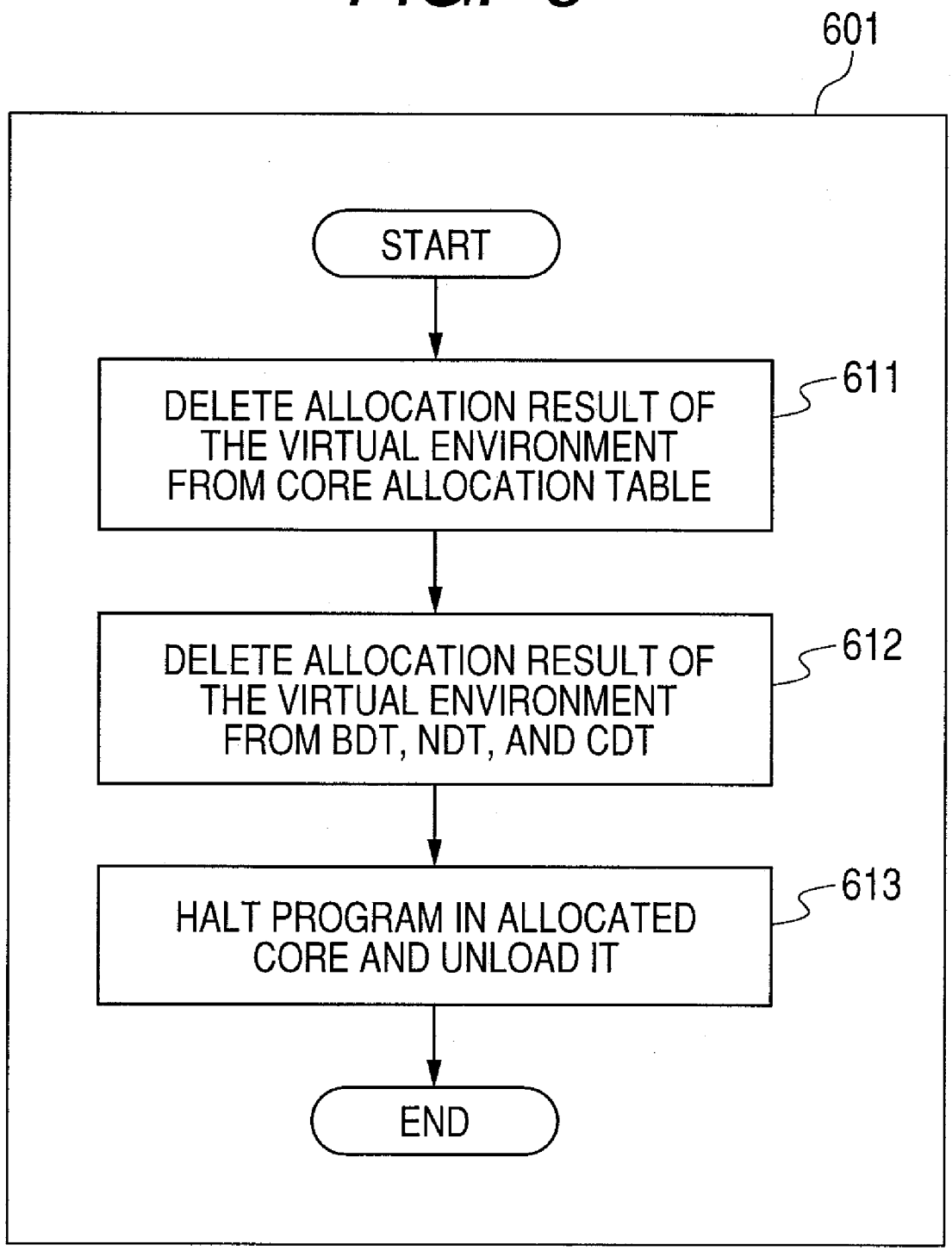
FIG. 6 is a flowchart showing a processing performed when the control board according to the first embodiment of the present invention receives a program unload request from the user.

FIG. 6 is a flowchart showing a processing 601 performed when the control board 141 according to the first embodiment of the present invention receives the program unload request from the user.

When the execution of the processing 601 is started, first at Step 611, the control board 141 deletes the allocation result of the virtual environment specified by the program unload request from the core allocation table 401.

Next at Step 612, the allocation result of the virtual environment is deleted from the virtual environment-board dispatch table 152, the virtual environment-NPU dispatch table 113, and the virtual environment-core dispatch table 203.

Finally at Step 613, the general purpose processing core 211 halts and unloads the program in the allocated core (namely, the general purpose processing core 211 or the packet processing core 221).

Figure 7A:
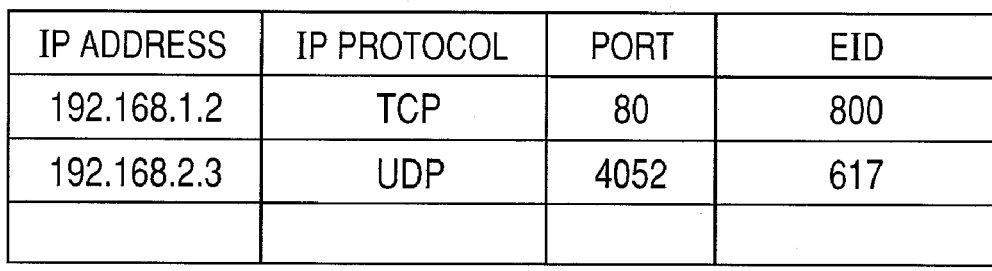
FIG. 7A is an explanatory diagram of a first correspondence table of user/service identification information and a virtual environment identifier a network interface according to the first embodiment of the present invention includes.
Figure 7B:
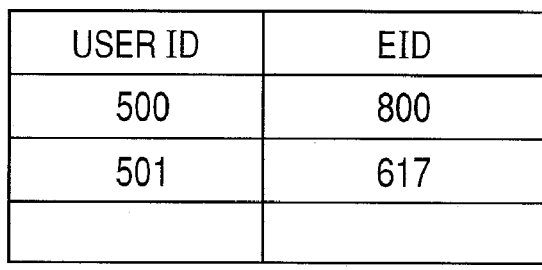
FIG. 7B is an explanatory diagram of a second correspondence table of the user/service identification information and the virtual environment identifier the network interface according to the first embodiment of the present invention includes.
Figure 7C:
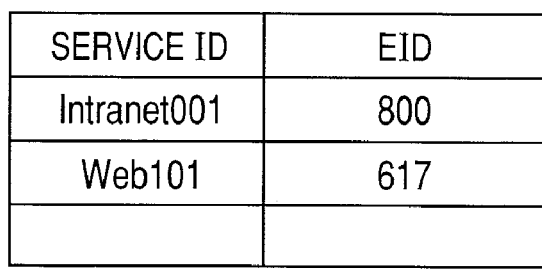
FIG. 7C is an explanatory diagram of a third correspondence table of the user/service identification information and the virtual environment identifier the network interface according to the first embodiment of the present invention includes.

FIG. 7A to FIG. 7C are explanatory diagrams of the correspondence table of the user/service identification information and the virtual environment identifier that the network interface 151 according to the first embodiment of the present invention has in it.

When receiving the packet, the network interface 151 specifies the virtual environment identifier corresponding to the packet based on the correspondence table shown in FIG. 7. As already explained, the virtual environment is associated with the user (e.g., the user who transmitted the packet or the user who requested the packet) or the service (e.g., a service that the user who transmitted or requested the packet uses). For this reason, the virtual environment identifier may be associated directly with the user identification information or the service identification information included in the packet. Alternatively, when the user or service corresponds to the address included in the packet, the virtual environment identifier may be associated with the address included in the packet.

The correspondence table shown in FIG. 7A includes information that associates the virtual environment identifier with the address; the correspondence table shown in FIG. 7B includes information that associates the virtual environment identifier with the user identification information; and the correspondence table shown in FIG. 7C includes information that associates the virtual environment identifier with the service identification information, respectively. Below, details of each correspondence table will be explained.

A correspondence table 701 shown in FIG. 7A is based on the assumption that the user or service is identified by a set consisting of three pieces of data: an IP address, an IP protocol (TCP, UDP, etc.), and a port (a TCP port or UDP port) (namely, multiple-to-one mapping from the set consisting of the above-mentioned three to the user or service exists). When the packet arrives at the control board 141, by searching the correspondence table 701 using the IP address, the IP protocol, and the port as search keys, it is possible to find a corresponding virtual environment identifier stored in the virtual environment identifier column (EID).

Incidentally, the correspondence table 701 includes the following contents. The virtual environment identifier corresponding to an IP address "192.168.1.2," an IP protocol "TCP," and a port "80" is "800." In addition, the virtual environment identifier corresponding to an IP address "192.168.2.3," an IP protocol "UDP," and a port "4052" is "617." For example, when an arrived packet includes the IP address "192.168.1.2," the IP protocol "TCP," and the port "80," the virtual environment identifier "800" is specified.

A correspondence table 702 shown in FIG. 7B is based on the assumption that the user is identified by a user identifier included in the packet. By searching a table 711 using the user identifier included in the packet when the packet arrives at the control board 141 as a search key, it is possible to find the corresponding virtual environment identifier stored in the virtual environment identifier column (EID).

In the case where the packet is encapsulated by a GRE (Generic Routing Encapsulation) protocol, the user identifier can be stored in a key column of a GRE header. When the packet like this arrives, it is possible to find the identifier of the virtual environment to which the packet should belong by taking out the user identifier from the key column. Also in the case where the packet is coded by MPLS or other tunneling protocols, it is possible to identify the user or service from information that the tunneling protocol includes in a like manner and to find the virtual environment identifier using the information.

Incidentally, the correspondence table 702 includes the following contents. The virtual environment identifier corresponding to a user identifier "500" is "800." In addition, the virtual environment identifier corresponding to a user identifier "501" is "617."

A correspondence table 703 shown in FIG. 7C is based on the assumption that a service is identified by a service identifier included in the packet. When the packet arrives at the control board 141, by searching a table 721 using the service identifier included in the packet as a search key, it is possible to find the corresponding virtual environment identifier stored in the virtual environment identifier column (EID). Also in this case, when the packet is encapsulated by the GRE protocol, it is possible to store the service identifier in the key column of the GRE header. When the packet like this arrives, it is possible to find the identifier of the virtual environment to which the packet should belong by taking out the service identifier from the key column.

Incidentally, the correspondence table 703 includes the following contents. The virtual environment identifier corresponding to a service identifier "Intranet001" is "800." The virtual environment identifier corresponding to a service identifier "Web01" is "617."

Below, some supplementary explanation will be given about a relation between the user/service identification information in the correspondence tables 701, 702, and 703, and the user/service identification information in the program load request and the program unload request. It is not necessarily required that the both are the same, and if the corresponding relation of the both is given in advance by a table etc., it is possible to dispatch the packet to a core to which the program has been loaded by associating the both in doing the processing 501 and the processing 601.

Figure 8:
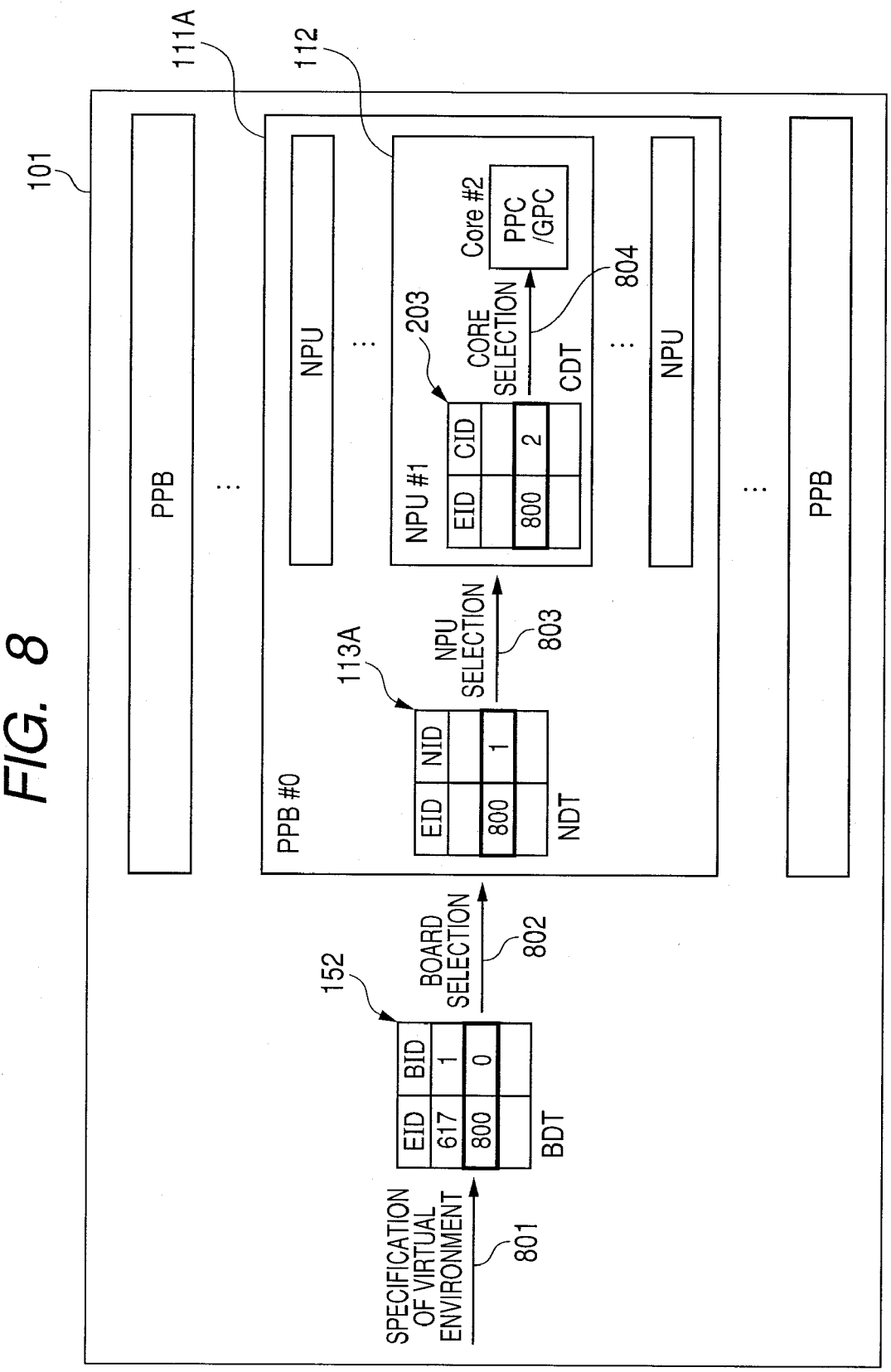
FIG. 8 is an explanatory diagram showing a transfer processing of a packet to a core when the packet arrives at the network interface in the first embodiment of the present invention.

FIG. 8 is an explanatory diagram showing a transfer processing of the packet to the core when the packet arrives at the network interface 151 in the first embodiment of the present invention.

When the packet arrives at the network interface 151, first, the network interface 151 finds the virtual environment identifier corresponding to the user/service identification information included in the packet using the correspondence table 701, 711, or 721 (Step 801). For example, in the case where the user identifier is "500," the virtual environment identifier "800" is found based on FIG. 7B.

Next, the network interface 151 finds the board identifier corresponding to the virtual environment identifier by searching the virtual environment-board dispatch table (BDT) 152 using the virtual environment identifier specified at Step 801 as a key. Then, the network interface 151 transfers the packet to the packet processing board (PPB) 111 with the specified board identifier by controlling the switch fabric 181 (Step 802). When the virtual environment identifier is "800," "0" is found as the board identifier and the packet is transferred to the packet processing board 111 whose board identifier is "0" (in the examples of FIG. 1 and FIG. 8, the packet processing board 111A indicated as "PPB #0").

Next, the packet processing board 111 of the packet transfer destination finds a corresponding NPU identifier by searching the virtual environment-NPU dispatch table (NDT) 113 in the packet processing board 111 using the virtual environment identifier as a key, and transfers the packet to the network processing device (NPU) 112 with the NPU identifier (Step 803). The virtual environment-NPU dispatch table 113A is searched in the example of FIG. 8. When the virtual environment identifier is "800," "1" is found as the NPU identifier and the packet is transferred to the network processing unit 112 with the NPU identifier "1."

Furthermore, the I/O control device 202 in the network processing device (NPU) 112 of a packet transfer destination finds a corresponding core identifier by searching the virtual environment-core dispatch table (CDT) 203 using the virtual environment identifier as a key, and transfers the packet to a core with the core identifier (Step 804). When the virtual environment identifier is "800," "2" is found as the core identifier and the packet is transferred to the core of the core identifier "2."

In the core of the transfer destination, the program loaded according to the user's load request is operating. Since this program can perform the processing with a smaller delay by using the SRAM 231 or the cache 271, the processing at wire speed becomes attainable.

The data and the program included in the cache 271 may be deleted automatically, and therefore processing at the wire speed may be interrupted. In order to prevent this problem, what is necessary is to perform the setup that specifies an address range of the above-mentioned data and program and thereby to prohibit the automatic deletion from the cache 271.

After performing the processing of the packet, this program can either transfer the packet to other specific packet processing board 111 or transfer it to a specific network interface. A processing shown in FIG. 8 is performed also in the packet processing board 111 of the transfer destination, and thereby the network processing unit 112 and a core are determined using the virtual environment identifier as a key.

Incidentally, in doing board selection, NPU selection, and core selection, if the plural board identifiers, NPU identifiers, or core identifiers corresponding to a single virtual environment identifier exist, what is necessary is to select an arbitrary one among them, and to transfer the packet to the selected board, NPU, or core. In doing this, the packet may be allocated using a random number. Alternatively, the packet may be allocated by detecting an operating condition of the board, the NPU, or the core and selecting one that is not currently used or one that has a fewer number of unprocessed packets that they have (the number of packets included in an input queue etc.).

Moreover, either in the case where one packet processing board 111 includes only one network processing unit 112, or in the case where the each packet processing board 111 is connected to the switch fabric 181 with as much interfaces as the number of the network processing units 112, allocation of the packet is unnecessary; therefore, the virtual environment-NPU dispatch table 113 is unnecessary. In this case, when the packet arrives at the network interface 151, the transfer processing of the packet to the core is performed as follows.

When the packet arrives at the network interface 151, the network interface 151 first finds the virtual environment identifier corresponding to the user/service identification information included in the packet using the correspondence table 701, 711, or 721.

Next, the network interface 151 finds the board identifier corresponding to the virtual environment identifier by searching the virtual environment-board dispatch table (BDT) 152 using the virtual environment identifier specified at Step 801 as a key.

Then, the network interface 151 transfers the packet to the packet processing board (PPB) 111 corresponding to the specified board identifier by controlling the switch fabric 181. Next, it transfers the packet to the network processing device (NPU) 112 of the packet processing board (PPB) 111 to which the packet was transferred.

Furthermore, the I/O control device 202 in the network processing device (NPU) 112 of the packet transfer destination finds the corresponding core identifier by searching the virtual environment-core dispatch table (CDT) 203 using the virtual environment identifier as a key, and transfers the packet to the core with the core identifier.

Thus, according to the first embodiment, by associating the plural board identifiers, NPU identifiers, or core identifiers with the single virtual environment identifier; it is possible to freely determine a processing capability for the each user or service. Furthermore, it is possible to use the core and a calculation resource accompanying it more effectively by determining the transfer destination of the packet based on the operating condition of the board, the NPU, or the core.

In the above, a fundamental part of the first embodiment of the present invention is ended, and below a supplementary explanation related to the first embodiment will be given.

The first supplementary explanation relates to a migration processing. In the first embodiment, there is a case where plural user groups or plural services operate simultaneously in a single network processing unit 112. However, there is a case where, while a part of the multiple cores is kept to be operated, a program cannot be loaded to the other part thereof depending on a design of the network processing unit 112. In such a case, what is necessary is to perform the following migration processing instead of the processing 501 performed at the time of the program load request.

For example, a case where a load request of a new program is processed at the time when the program has been loaded to a part of the multiple cores included in the network processing unit 112A, the program has not yet been loaded to the remaining cores, and the program has not yet been loaded to any core of the network processing unit 112B will be explained.

In this case, the control board 141 loads all programs that are operating in the network processing unit 112A also to the network processing unit 112B. However, in the case where the network processing unit 112B can use the program having already been loaded to the main storage etc., as it is, it is not ?necessary to load it newly.

In addition, that the program has not yet been loaded to any of the cores of the network processing unit 112B can be confirmed based on the core allocation table 401. That is, the network processing unit 112B is selected based on the core allocation table 401.

The above-mentioned selection of the network processing unit 112B is performed instead of core allocation explained at Step 511 of FIG. 5. Load of the program to the selected core of the network processing unit 112B is performed by the same method as that at Step 512.

After that, each table is set up like at Step 513. However, at this time, only the setup of the virtual environment-board dispatch table (BDT) 152 at Step 513 is not yet performed. That is, even after the program has been loaded to the each core of the network processing unit 112B, the packet inputted into the network interface 151 continues to be processed in the network processing unit 112A.

Further, the control board 141 loads the program that was requested to be loaded to a core of the network processing unit 112B to which the program has not yet been loaded. This load is performed like at Step 512. After this processing, the packet belonging to the virtual environment inputted into the network interface 151 is processed in the network processing unit 112B.

Here, by performing the setup of the virtual environment-board dispatch table 152 that was delayed for all the programs, the packets heretofore processed in the network processing unit 112A will come to be processed altogether in the network processing unit 112B. That is, migration is realized by this.

After the migration is completed, the network processing unit 112A is no longer used. For this reason, the control board 141 changes all the cores in the network processing unit 112A into an unused state, and unloads the loaded program according to the processing 601. This processing deletes the setup for the network processing unit 112A also from the core allocation table 401. However, in the case where the program is used also in the second network processing unit 112, it is not unloaded.

Even in the case where the program cannot be changed in the network processing unit 112 of multiple cores during an operation of the core because of the above-mentioned migration processing, a single network processing unit 112 can be allocated to the plural users while continuing the operation of the program.

A second supplementary explanation relates to the packet output processing to a network that is different for each virtual environment.

The second supplementary explanation will be given using FIG. 9.

Figure 9:
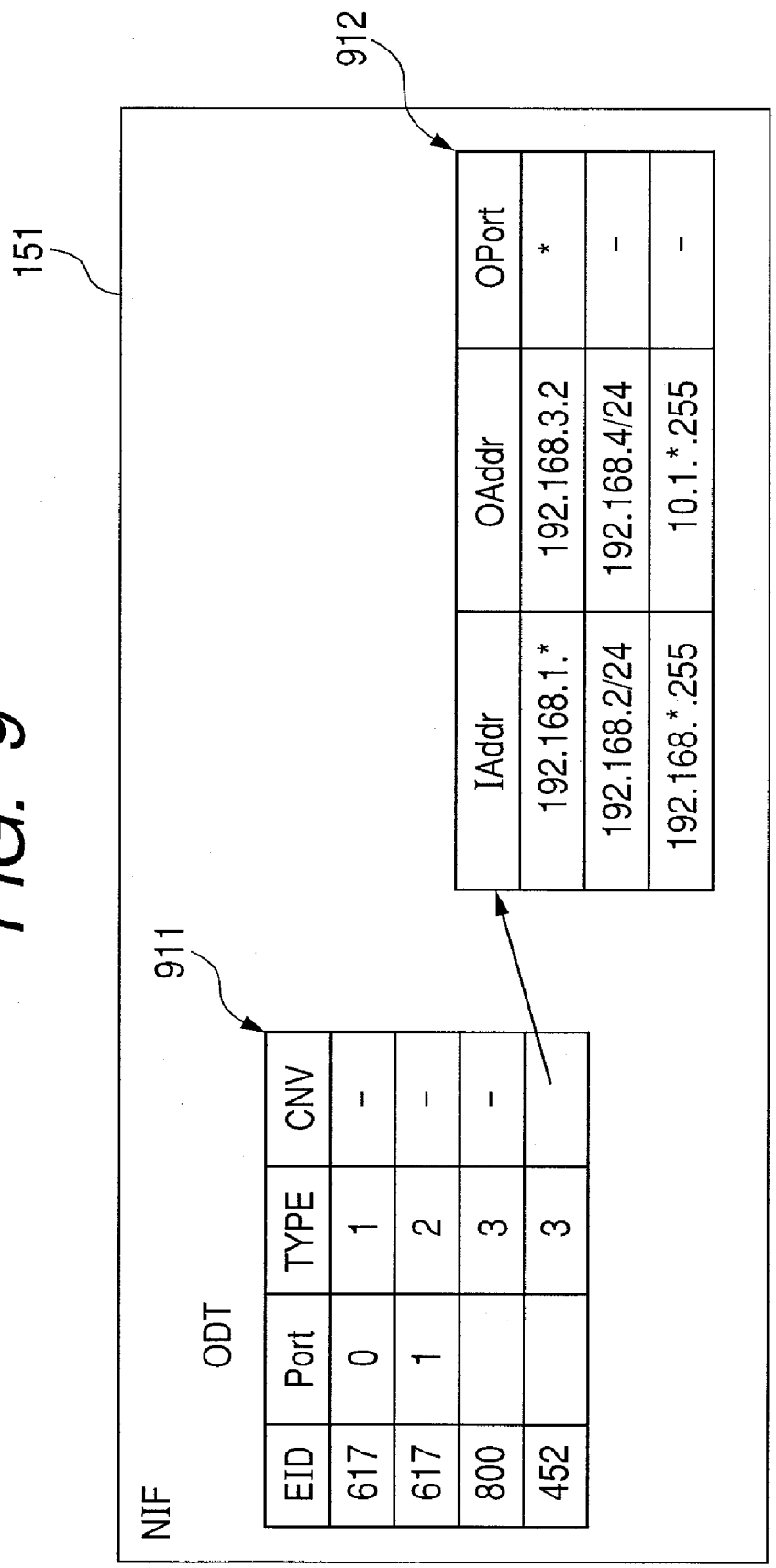
FIG. 9 is an explanatory diagram of an output dispatch table according to the first embodiment of the present invention.

FIG. 9 is an explanatory diagram of an output dispatch table according to the first embodiment of the present invention.

Regarding the packet outputted to the network from the packet processing board 111 via the network interface 151, by retaining an output dispatch table 911 in the network interface 151, the following processings become possible.

The output dispatch table 911 defines correspondence between the virtual environment and deletion or translation of the address of the packet that is performed in the virtual environment. Specifically, the output dispatch table 911 includes a set of the virtual environment identifier (EID), a port number (Port) of the network interface, a packet output processing type (TYPE), and an address translation table (CNV).

In the example of FIG. 9, the packet output processing type corresponding to the virtual environment identifier "617" and a port number "0" is "1." In this example, when outputting the packet whose virtual environment identifier is "617" to the port "0," the network interface 151 deletes all the address information that the packet has, and outputs it. That is, when the packet that the network interface 151 intends to output now includes the IP address, it deletes the IP address, and when the packet includes a MAC address, it also deletes the MAC address.

For example, regarding the virtual environment identifier "617," in the case where addressing in unnecessary because the port "0" concerned is connected to only one communication partner, "1" is set up as the packet output processing type corresponding to them. Incidentally, although addresses of the destination and the sender are deleted together in the above-mentioned example, only the address of the sender may be saved by altering the packet processing type.

When the virtual environment identifier is "617" and the port number is "1" in the output dispatch table 911, the packet output processing type is "2." In this example, when the network interface 151 outputs the packet whose virtual environment identifier is "617" to the port "1," it outputs it after deleting address information of the third layer that the packet has. If the third layer is an IP layer, the IP header will be deleted. If the packet does not have the address information of the third layer, it will be outputted as it is.

Although only a sender address can be saved as in the case where the packet output processing type is "1," a substitute protocol that enables only the sender address to be specified is used because an Internet protocol cannot be used in that case. When the virtual environment identifier is "617" and the port number is "1," the network interface 151 does not perform the address translation because the address translation table is not specified.

When the virtual environment identifier is "800" in the output dispatch table 911, the packet output processing type is "3." In this case, since the port number is not specified, the same packet output processing type is applied to all the ports. When the virtual environment identifier of the outputted packet is "800," the network interface 151 outputs the address information that the packet has, without deleting it. If the packet has the address information of the third layer, the network interface 151 outputs it as it is; if the packet does not have the address information, the network interface 151 finds the address information of the third layer based on address information of the second layer and inserts a third layer header into the packet. If a third layer switch (for example, a later-described third layer switch 1012) retains correspondence of the MAC addresses and the IP address in an ARP table (illustration omitted) that exists in every network interface 151, at the time of reception of an ARP (Address Resolution Protocol) packet, it will be possible to find the IP address corresponding to the MAC address and insert the third layer header at the time of outputting the packet. When the virtual environment identifier is "800," address translation is not performed because the address translation table is not specified When the virtual environment identifier is "452" in the output dispatch table 911, the packet output processing type is "3." That is, when the network interface 151 outputs the packet whose virtual environment identifier is "452," it does not delete the address information included in the packet.

In the output dispatch table 911, an address translation table 912 corresponding to the virtual environment identifier "452" has been specified. Since the packet processing type is "3," the network interface 151 translates the address of the third layer as follows.

The network interface 151 first searches the address included in the packet in an IAddr column.

When the address included in the packet is "192.168.1.2," a value "192.168.1.*" of the IAddr matches with this address ("*" is a wild card). Therefore, the network interface 151 rewrites the address included in the packet with OAddr corresponding to the above-mentioned searched IAddr, i.e., "192.168.3.2." However, since "*" is specified in an OPort column, the network interface 151 changes a port according to a content of the lower 8 bits of the address. That is, NAPT translation (Network Address Port Translation) is performed.

When the address included in the packet is "192.168.2.3," as a search result "192.168.2/24" as the IAddr matches with it ("24" is the effective number of bits). Therefore, the network interface 151 rewrites first 24 bits of the searched IAddr with OAddr corresponding to it, i.e., with "192.168.4." Since the OPort column is not specified, rewriting of the port is not performed.

When the address included in the packet is "192.168.3.255," as a result of search, "192.168.*.255" as the IAddr matches with it. Therefore, the network interface 151 rewrites top 16 bits of the address with "10.1," and rewrites the lower 8 bits of the address with "255." Remaining 8-bits shall be as it is. Since the OPort column is not specified also in this case, rewriting of the port is not performed.

In addition, since it is necessary to set the address translation table 912 on high speed memory for fast transfer of the packet, it is necessary to hold down the total amount of memory. When the address translation table 912 with the identical content is directed from plural columns of the output dispatch table 911, the amount of memory can be held down by directing the same output dispatch table 911. Instead of having the address translation table 912 in every network interface 151, by plural network interfaces 151 sharing the address translation table 912, the amount of memory can be held down further.

When the packet processing type is "1," the address translation table cannot be specified because the output packet does not include the address. When the packet processing type is "2," the address translation table translates the address of the second layer because the output packet includes the address of the second layer. Since in an Ethernet (registered trademark, the same below), every MAC address is treated independently, one by one, range specification is not performed but a pair of addresses is specified, one by one, in the address translation table.

Incidentally, in the packet processing device 101, although the packet processing board 111 and the network interface 151 were separated, the network interface may be placed on the packet processing board 111. In this case, it is possible to transmit the packet outputted in the processing in the packet processing board 111 to the network from the network interface on the packet processing board 111 without transmitting it to the network interface 151. In doing this transmission, it is possible to perform the packet output processing to a network that is different for each virtual environment using the output dispatch table 911 and the address translation table 912 on the packet processing board 111.

In the case where the packet is outputted from the packet processing board 111 via the network interface 151, there is a possibility that the packet coming from other packet processing board 111 or other network interface 151 is outputted together from the network interface 151. However, by using the above-mentioned configuration, it is possible to output only the packet processed in the packet processing board 111 from the network interface on the packet processing board 111. Therefore, the packet processing board 111 can measure a traffic quantity processed in the packet processing board 111 and perform a traffic control, such as shaping, based on it.

Hereafter, a second embodiment of the present invention will be explained.

Figure 10:
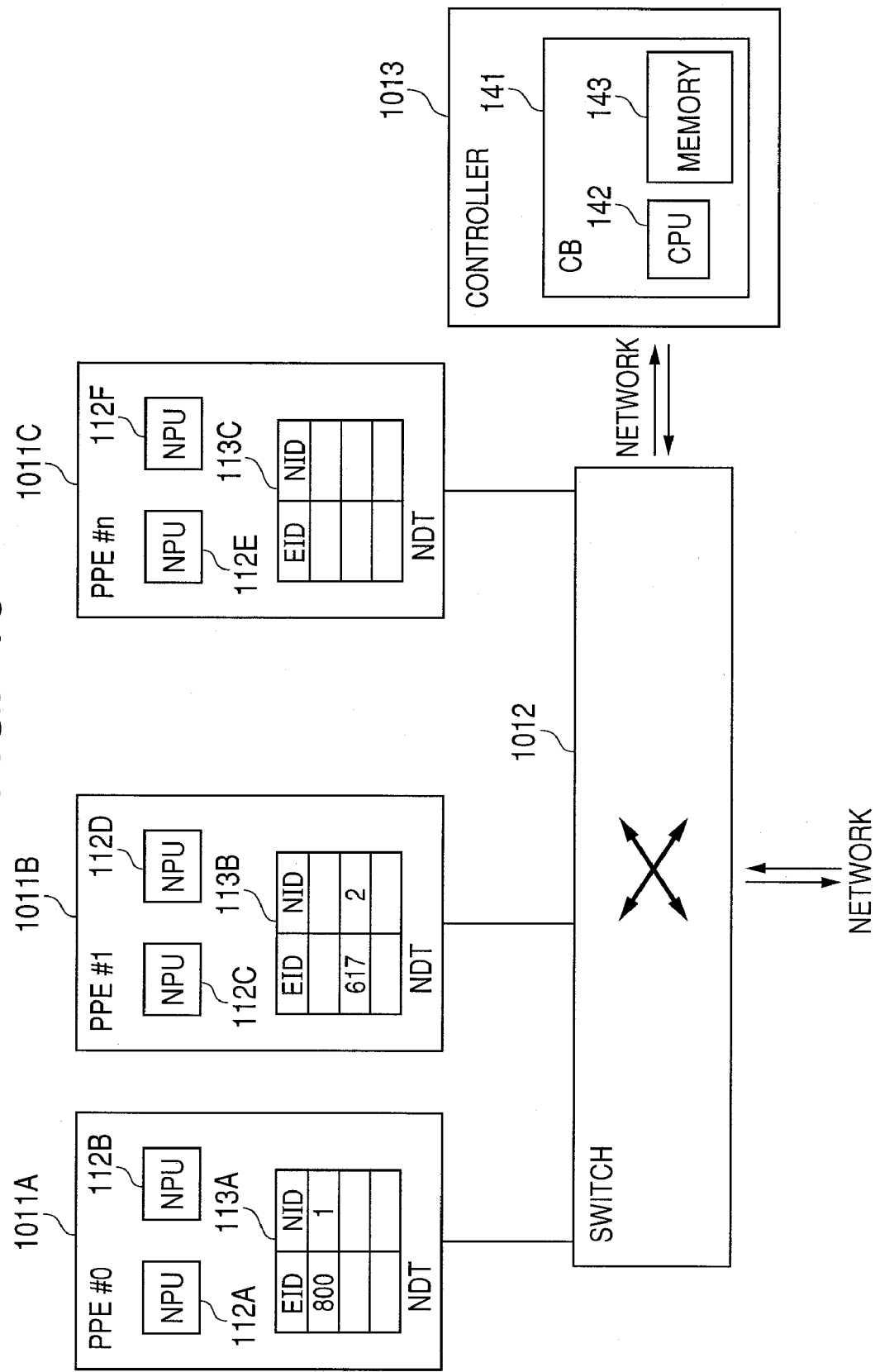
FIG. 10 is a block diagram showing an entire configuration of a packet processing system according to a second embodiment of the present invention.

FIG. 10 is a block diagram showing the entire configuration of the packet processing system according to the second embodiment of the present invention.

The system shown in FIG. 10 realizes a function equivalent to that of the packet processing device 101 in the first embodiment.

Specifically, the system shown in FIG. 10 has plural packet processing device (PPE) 1011, the third layer switch 1012 and a control unit 1013. The plural packet processing devices (PPE) 1011 are connected with the third layer switch 1012 by 10-Gbit Ethernet. The third layer switch 1012 further carries a 10-Gbit Ethernet interface (illustration omitted), and is connected with other devices thereby.

The control unit 1013 is connected with the third layer switch 1012 directly or indirectly. The control unit 1013 includes the control board 141, and the control board 141 includes the general purpose CPU 142 and the main storage 143.

The packet processing device 1011 includes one or plural network processing devices (NPU's) 112, and the virtual environment-NPU dispatch table (NDT) 113 like the packet processing board 111. The virtual environment-NPU dispatch table (NDT) 113 is a table that has a set of the virtual environment identifier and the NPU identifier as an element.

Incidentally, the packet processing device 1011 may be mounted as a processing module in any form like the packet processing board 111. For example, the packet processing board 111 shown in the first embodiment may be used as the packet processing device 1011.

FIG. 10 shows the n packet processing devices 1011 as an example. However, only three of the n packet processing devices 1011 are shown in FIG. 10 as packet processing devices 1011A, 1011B, and 1011C. When giving an explanation common to all of the packet processing devices 1011A to 1011C in this embodiment, these are also generically named and described the packet processing device 1011.

The each packet processing device 1011 is given an identifier based on an integer. For example, "PPE #0" displayed on the packet processing device 1011A of FIG. 10 expresses that the packet processing device (PPE) 1011A is given the identifier "0."

The packet processing device 1011A has the network processing units 112A, 112B and the virtual environment-NPU dispatch table 113A; the packet processing device 1011B has the network processing units 112C, 112D and the virtual environment-NPU dispatch table 113B; and the packet processing device 1011C has the network processing units 112E, 112F and the virtual environment-NPU dispatch table 113C, respectively. The network processing units 112A to 112F are also described as the network processing units 112 like the first embodiment. The virtual environment-NPU dispatch tables 113A to 113C are also described as the virtual environment-NPU dispatch table 113. The network processing unit 112 and the virtual environment-NPU dispatch table 113 are the same as those explained in the first embodiment.

The third layer switch 1012 has a policy-based routing function.

The packet inputted from the network is transferred to the packet processing device 1011 via the third layer switch 1012, is processed there, and further is transferred to another packet processing device 1011 via the third layer switch 1012 or is outputted to the network. To which one of the plural packet processing devices 1011 the packet inputted into the third layer switch 1012 is transferred is determined by a setup content of the policy-based routing that the third layer switch 1012 has. That is, in the first embodiment, the control board 141 sets up the virtual environment-board dispatch table 152 in the processing 501 at the time of receiving the program load request and in the processing 501 at the time of receiving the program unload request. On the contrary, in the second embodiment, the control board 141 sets up the following policy-based routing. To which unit of the plural network processing units 112 the packet that should be processed in the packet processing device 1011 is transferred is determined by the virtual environment-NPU dispatch table 113 like the first embodiment.

Determination of the packet processing device 1011 by policy-based routing is performed as follows. The third layer switch 1012 uses the following commands for the setup of the policy-based routing (these commands are equal to those for a third layer switch AX7800S of Alaxala (registered trademark) Networks Corporation).

policy-list 10 ppe1 192.168.10.2          (1)

policy-group to_ppe1 list 10          (2)

flow filter user617 in list 100 any action policy_group to_ppe1          (3)

The command (1) expresses that the packet processing device 1011B (PPE #1) is connected to a network interface "ppe1" of the third layer switch 1012, the packet processing device 1011B (PPE #1) is given the IP address "192.168.10.2," and is given "10" as the identification number.

The command (2) expresses that the setup of policy-based routing consists of only one element whose identification number is "10," and a name "to Apel" is given to the setup.

The command (3) expresses that the policy-based routing of "to_ppe1" is applied to a packet that arrived at a VLAN interface "user 617" that is set up so that only a specific user group may use it (network interface virtualized for each VLAN). After all, a VLAN number "617" and the packet processing device 1011B (PPE #1) identified by the identifier "1" are associated with each other by the commands (1) to (3). When the VLAN number "617" has been allocated to "user 617," upon input of the packet with the VLAN number 617, the packet is transferred to the packet processing device 1011B (PPE #1) and is processed there.

Incidentally, the VLAN is associated with the virtual environment in this embodiment.

In order to set the VLAN number "617" to the packet of the user belonging to the user group concerned, what is necessary is to give a VLAN function to anyone of the switches between the user's apparatus and the third layer switch 1012 and to set up the VLAN number "617" using a tag VLAN function of the switch. In the case where only the user group concerned uses a specific port of the switch, it is not necessary to identify the user of the packet inputted into the port or a service, and what is necessary is to set up the VLAN number 617 in all the packets.

When the third layer switch 1012 is set up by the command (1), the IP address "192.168.10.2" connected to the network interface "ppe1" is selected as the transfer destination of the packet with the VLAN number "617." That is, as a destination MAC address of the packet, the third layer switch 1012 sets up the MAC address corresponding to the IP address "192.168.10.2" received by ARP (Address Resolution Protocol). When the plural packet processing devices 1011 are connected to the network interface "ppe1," it is indispensable to specify the IP address in the command (1). However, if the number of the packet processing devices 1011 connected to the network interface "ppe1" is unity, it is not necessary to specify the IP address. That is, the following command can be used instead of the command (1).

policy-list 10 ppe1          (1')

In this case, when the packet arrives at the network interface "ppe1" from the packet processing device 1011, by associating the MAC address of the sender with "ppe1" and retaining it, the transfer destination MAC address of the packet with the VLAN number "617" can be uniquely determined.

According to this method, it becomes unnecessary to give the IP address to the packet processing device 1011, so that the IP address can be saved. Furthermore, since it becomes unnecessary to install a stack of the Internet protocol in the packet processing device 1011 depending on the case, light weight of the program can be achieved.

Moreover, in the case where the packet processing device 1011 is set up to receive any arriving packet irrespective of its destination address (for example, in the case where the setup equivalent to promiscuous mode in Linux is made), Even when the third layer switch 1012 sends out the packet from the network interface "ppe1" without changing its destination address and sender address, it can deliver the packet to the packet processing device 1011. This method is applicable only to the packet with a specific virtual environment identifier. That is, regarding the packet with another virtual environment identifier, it can be sent out from other network interfaces than "ppe1" by rewriting the destination address. Incidentally, according to this method, it is possible for the packet processing device 1011 to perform the processing using the destination address and the sender address that were attached to the packet originally.

Furthermore, in the case where the packet processing device 1011 is set up to receive an arriving packet without depending on the destination address, even if the packet that the third layer switch 1012 outputs does not include the destination address, the packet can be delivered to the packet processing device 1011. For this reason, the destination address column of that packet can be deleted. Furthermore, if the sender address is unnecessary, it can also be deleted. However, the packet with these addresses deleted is not in conformity with the Ethernet standard (IEEE standard). This method is also applicable only to the packet with a specific virtual environment identifier. According to this method, an amount of transfer data can be held down only by an amount of address.

According to the second embodiment in the above, even in the case where the existing third layer switch, such as AX7800S, is used instead of newly developing all the devices, it is possible to attain the main effects of the present invention.

What is claimed is:

1. The packet processing method connected to a network, comprising:
multiple processor cores; and
memory connected to the multiple processor cores, wherein, upon reception of a load request of a program, the packet processing device selects a processor core to which the program has not yet been loaded among the multiple processor cores, wherein the packet processing device loads the program to the selected processor core;

wherein the packet processing device retains first association information that associates attribute information specified by the load request with the processor core to which the program is loaded;

wherein upon reception of the packet, the packet processing device specifies the attribute information corresponding to the received packet; and wherein the packet processing device transfers the received packet to the processor core corresponding to the specified attribute information.

2. The packet processing device according to claim 1, wherein the packet processing device selects the processor core to which the program has not yet been loaded based on the first association information.

3. The packet processing device according to claim 1, wherein the packet processing device retains second association information that associates at least one of an address, a user identifier, and a service identifier with the attribute information; and wherein, upon reception of the packet, the packet processing device specifies the attribute information corresponding to at least one of the address, the user identifier, and the service identifier that are included in the received packet based on the second association information.

4. The packet processing device according to claim 1, comprising:

a switch for transferring the packet;

a plurality of packet processing modules connected to the switch;

a plurality of network interfaces connected to the switch and the network; and a control part for controlling the packet processing device, wherein the each packet processing module includes a plurality of network processing units;

wherein the each network processing unit includes the multiple processor cores;

wherein the first association information includes third association information, fourth association information, fifth association information, and sixth association information;

wherein the third association information is retained by the control part, and associates the attribute information, identification information of the processor core, identification information of the network processing unit including the processor core, and identification information of the packet processing module including the network processing unit;

wherein the fourth association information includes at least the same information as information that associates the attribute information with the identification information of the processor core among pieces of the third association information;

wherein the fifth association information includes at least the same information as information that associates the attribute information with the identification information of the network processing unit among pieces of the third association information;

wherein the sixth association information includes at least the same information as information that associates the attribute information with the identification information of the packet processing module among pieces of the third association information;

wherein the each network interface retains the sixth association information and, upon reception of the packet from the network, transfers the received packet to the packet processing module corresponding to the specified attribute information based on the sixth association information;

wherein the each packet processing module retains the fifth association information and, upon reception of the packet, transfers the received packet to the network processing unit corresponding to the specified attribute information based on the fifth association information; and wherein the each network processing unit retains the fourth association information and, upon reception of the packet, transfers the received packet to the processor core corresponding to the specified attribute information based on the fourth association information.

5. The packet processing device according to claim 4, wherein the each network interface further retains information that defines translation or deletion of the address of the packet corresponding to the attribute information, upon reception of the packet from the network, translates or deletes the address of the received packet based on the specified attribute information and the information that defines the translation or deletion of the address, and translates the packet including the translated address or the packet with the address deleted to the packet processing module.

6. The packet processing device according to claim 1, which is connected to the network, the device comprising:

a switch for transferring the packet;

a plurality of packet processing modules connected to the switch; and a control part for controlling the packet processing device, wherein the each packet processing module includes a plurality of network processing units, wherein the each network processing unit includes the multiple processor cores, wherein the first association information includes third association information, fourth association information, and fifth association information, wherein the third association information is retained by the control part and associates the attribute information, identification information of the processor core, identification information of the network processing unit including the processor core, and identification information of the packet processing module including the network processing unit, wherein the fourth association information includes at least the same information as information that associates the attribute information with the identification information of the processor core among pieces of the third association information, wherein the fifth association information includes at least the same information as information that associates the attribute information with the identification information of the network processing unit among pieces of the third association information, wherein the control part transfers a command that associates the specified attribute information with the packet processing module to the switch based on the third association information, wherein, upon reception of the packet from the network, the switch transfers the received packet to the packet processing module corresponding to the specified attribute information based on the command, wherein the each packet processing module retains the fifth association information and, upon reception of the packet, transfers the received packet to the network processing unit, corresponding to the specified attribute information based on the fifth association information, and wherein the each network processing unit retains the fourth association information and, upon reception of the packet, transfers the received packet to the processor core corresponding to the specified attribute information based on the fourth association information.

7. The packet processing device according to claim 1, comprising:
   a first network processing unit; and
   a second network processing unit,
   wherein the first network processing unit and the second network processing unit each include the multiple processor cores,
   wherein, upon reception of a load request of a program at the time when the program has already been loaded to at least one of the multiple processor cores the first network processing unit includes, the program has not yet been loaded to at least one of other processor cores, and the program has not yet been loaded also to any of the processor cores the second network processing unit includes, the packet processing device loads the program that has been loaded to at least one of the multiple processor cores the first network processing unit includes to at least one of the multiple processor cores the second network processing unit includes, and
   wherein the packet processing device further loads the program specified by the received load request to a processor core to which the program has not yet been loaded among the multiple processor cores the second network processing unit includes.

8. The packet processing device according to claim 1, comprising:
   a switch for transferring the packet;
   a plurality of packet processing modules connected to the switch;
   a plurality of network interfaces connected to the switch and the network; and
   a control part for controlling the packet processing device,
   wherein the each packet processing module includes a network processing unit,
   wherein the each network processing unit includes the multiple processor cores,
   wherein the first association information includes third association information, fourth association information, and fifth association information,
   wherein the third association information is retained by the control part, and associates the attribute information, identification information of the processor core, identification information of the network processing unit including the processor core, and identification information of the packet processing module including the network processing unit,
   wherein the fourth association information includes at least the same information as information that associates the attribute information with the identification information of the processor core among pieces of the third association information,
   wherein the fifth association information includes at least the same information as information that associates the attribute information with the identification information of the packet processing module among pieces of the third association information,
   wherein the each network interface retains the fifth association information and, upon reception of the packet from the network, transfers the received packet to the packet processing module corresponding to the specified attribute information based on the fifth association information,
   wherein the each packet processing module transfers the received packet to the network processing unit; and
   wherein the network processing unit retains the fourth association information and, upon reception of the packet, transfers the received packet to the processor core corresponding to the specified attribute information.

9. The packet processing method of a packet processing device connected to a network, the packet processing device including multiple processor cores and memory connected to the multiple processor cores, the method comprising:
   a first process of, upon reception of a load request of a program, selecting a processor core to which the program has not yet been loaded among the multiple processor cores;
   a second process of loading the program to the selected processor core;
   a third process of retaining first association information that associates attribute information specified by the load request with a processor core to which the program has been loaded,
   a fourth process of, upon reception of the packet, specifying attribute information corresponding to the received packet; and
   a fifth process of transferring the received packet to a processor core corresponding to the specified attribute information.

10. The packet processing method according to claim 9, wherein the first process includes a process of selecting a processor core to which the program has not yet been loaded based on the first association information.

11. The packet processing method according to claim 9, wherein the packet processing device retains second association information that associates at least one of the address, an identifier of a user, and an identifier of a service with the attribute information, and
   wherein the fourth process includes a process of specifying the attribute information corresponding to at least one of the address, the identifier of the user, and the identifier of the service that are included in the received packet.

12. The packet processing device according to claim 9, wherein the packet processing device includes a switch for transferring the packet, a plurality of packet processing modules connected to the switch, a plurality of network interfaces connected to the switch and the network, and a control part for controlling the packet processing device,
   wherein the each packet processing module includes a plurality of network processing units,
   wherein the each network processing unit has the multiple processor cores,
   wherein the first association information includes third association information, fourth association information, fifth association information, and sixth association information,
   wherein the third association information is retained by the control part, and associates the attribute information, identification information of the processor core, identification information of the network processing unit including the processor core, and identification information of the packet processing module including the network processing unit, wherein the fourth association information includes at least the same information as information that associates the attribute information with the identification information of the processor core among pieces of the third association information, wherein the fifth association information includes at least the same information as information that associates the attribute information with the identification information of the network processing unit among pieces of the third association information, wherein the sixth association information includes at least the same information as information that associates the attribute information with the identification information of the packet processing module among pieces of the third association information, wherein the each network processing unit retains the fourth association information, wherein the each packet processing module retains the fifth association information, wherein the each network interface retains the sixth association information, wherein the fifth process includes:

a sixth process of, upon reception of the packet from the network, transferring the received packet to the packet processing module corresponding to the specified attribute information based on the sixth association information;

a seventh process of, upon reception of the packet, transferring the received packet to the network processing unit corresponding to the specified attribute information based on the fifth association information; and an eighth process of, upon reception of the packet, transferring the received packet to the processor core corresponding to the specified attribute information based on the fourth association information.

13. The packet processing device according to claim 12, wherein the each network interface further retains information that defines translation or deletion of an address of the packet corresponding to the attribute information, wherein the sixth process includes a process of, when the each network interface receives the packet from the network, translating or deleting the address of the received packet based on the specified attribute information and information that defines translation or deletion of the address, and transferring the packet including the translated address or the packet with the address deleted to the packet processing module.

14. The packet processing method according to claim 9, wherein the packet processing device is connected to the network, and has a switch for transferring the packet, a plurality of packet processing modules connected to the switch, and a control part for controlling the packet processing device, wherein the each packet processing module has a plurality of network processing units, wherein the each network processing unit has the multiple processor cores, wherein the first association information includes third association information, fourth association information, and fifth association information, wherein the third association information is retained by the control part and associates the attribute information, identification information of the processor core, identification information of the network processing unit including the processor core, and identification information of the packet processing module including the network processing unit, wherein the fourth association information includes at least the same information as information that associates the attribute information with the identification information of the processor core among pieces of the third association information, wherein the fifth association information includes at least the same information as information that associates the attribute information with the identification information of the network processing unit among pieces of the third association information, wherein the each network processing unit retains the fourth association information, wherein the each packet processing module retains the fifth association information, the method further comprising:

a process where the control part transfers a command that associates the specified attribute information with the packet processing module based on the third association information to the switch, wherein the fifth process includes:

a process of, when the switch receives the packet from the network, transferring the received packet to the packet processing module corresponding to the specified attribute information based on the command;

a process of, when the each packet processing module receives the packet, transferring the received packet to the network processing unit corresponding to the specified attribute information based on the fifth association information; and a process of, when the each network processing unit receives the packet, transferring the received packet to the processor core corresponding to the specified attribute information based on the fourth association information.

15. The packet processing method according to claim 9, wherein the packet processing device includes a first network processing unit and a second network processing unit, wherein the first network processing unit and the second network processing unit each include the multiple processor cores, wherein the second process includes:

a process of, when the program has already been loaded to at least one of the multiple processor cores the first network processing unit includes, the program has not yet been loaded to at least one of other processor cores, and the program has not yet been loaded to any of the processor cores the second network processing unit includes, loading the program that has been loaded to at least one of the multiple processor cores the first network processing unit includes to at least one of the multiple processor cores the second network processing unit includes; and a process of loading the program specified by the received load request to a processor core to which the program has not yet been loaded among the multiple processor cores the second network processing unit includes.

16. The packet processing method according to claim 9, wherein the packet processing device includes a switch for transferring the packet, a plurality of packet processing modules connected to the switch, a plurality of network interfaces connected to the switch and the network, and the control part for controlling the packet processing device, wherein the each packet processing module has a network processing unit, wherein the each network processing unit has the multiple processor cores, wherein the first association information includes third association information, fourth association information, and fifth association information, wherein the third association information is retained by the control part, and associates the attribute information, identification information of the processor core, identification information of the network processing unit including the processor core, and identification information of the packet processing module including the network processing unit, wherein the fourth association information includes at least the same information as information that associates the attribute information with the identification information of the processor core among pieces of the third association information, wherein the fifth association information includes at least the same information as information that associates the attribute information with the identification information of the packet processing module among pieces of the third association information, wherein the each network processing unit retains the fourth association information, wherein the each network interface retains the fifth association information, wherein the fifth process includes:

a sixth process of, when the each network interface receives the packet from the network, transferring the received packet to the packet processing module corresponding to the specified attribute information based on the fifth association information;

a seventh process of, when the each network interface received the packet, transferring the received packet to the network processing unit; and an eighth process of, when the each network processing unit receives the packet, transferring the received packet to the processor core corresponding to the specified attribute information based on the fourth association information.

* * * * *